US012763245B2

(12) United States Patent
Song et al.

(10) Patent No.: US 12,763,245 B2
(45) Date of Patent: Oct. 13, 2026

(54) PICKUP APPARATUS USING MULTI PICKUP COIL FOR WIRELESS CHARGING OF ELECTRIC VEHICLE AND INDUSTRIAL EQUIPMENT

(71) Applicant: WIPOWERONE.INC, Daejeon (KR)

(72) Inventors: Bo-Yune Song, Daejeon (KR); Kyo-Il Lee, Sejong-si (KR); Seong-Joo Kang, Daejeon (KR); Ye-Chang Jeong, Daejeon (KR); Dong-Kwan Seo, Daejeon (KR); Byung-Ju Lee, Daejeon (KR); Jin-Seob Choi, Daejeon (KR)

(73) Assignee: WIPOWERONE.INC, Daejeon (KR)

( * ) Notice: Subject to any disclaimer, the term of this patent is extended or adjusted under 35 U.S.C. 154(b) by 789 days.

(21) Appl. No.: 18/013,349

(22) PCT Filed: Jul. 2, 2021

(86) PCT No.: PCT/KR2021/008428

§ 371 (c)(1),
(2) Date: Dec. 28, 2022

(87) PCT Pub. No.: WO2022/005250

PCT Pub. Date: Jan. 6, 2022

(65) Prior Publication Data

US 2023/0268114 A1 Aug. 24, 2023

(30) Foreign Application Priority Data

Jul. 2, 2020 (KR) ........................ 10-2020-0081701

(51) Int. Cl.
*H01F 27/08* (2006.01)
*B60L 53/122* (2019.01)
(Continued)

(52) U.S. Cl.
CPC ............ *H01F 27/08* (2013.01); *B60L 53/122* (2019.02); *H01F 27/24* (2013.01); *H01F 27/28* (2013.01);
(Continued)

(58) Field of Classification Search
CPC .......... H01F 27/08; H01F 27/24; H01F 27/28; H01F 27/38; H01F 27/40; H01F 27/22;
(Continued)

(56) References Cited

U.S. PATENT DOCUMENTS

| | | | | |
|---|---|---|---|---|
| 2012/0049991 A1* | 3/2012 | Baarman | H02J 50/005 | |
| | | | 336/199 | |
| 2019/0052116 A1* | 2/2019 | Bae | H02J 50/90 | |
| 2020/0021135 A1* | 1/2020 | Lee | H02J 50/90 | |

FOREIGN PATENT DOCUMENTS

| | | | | |
|---|---|---|---|---|
| JP | 2013192450 A * | 9/2013 | H01F 38/14 | |
| KR | 101482599 B1 * | 1/2015 | H02J 50/12 | |
| WO | WO-2020101177 A1 * | 5/2020 | H01F 38/14 | |

* cited by examiner

*Primary Examiner* — Shawki S Ismail
*Assistant Examiner* — Kazi S Hossain
(74) *Attorney, Agent, or Firm* — LEX IP MEISTER, PLLC

(57) ABSTRACT

Disclosed are a multi pickup coil for wireless charging of an electric vehicle such as an electric bus or an electric passenger car and industrial equipment while stopping or driving, and a pickup apparatus having the multi pickup coil. The multi pickup coil and the pickup apparatus provide high-capacity and high-efficiency wireless charging per unit area by performing performance enhancement through an optimal design in order to overcome the limitations of a circular pickup coil.

11 Claims, 12 Drawing Sheets

(51) Int. Cl.
*H01F 27/24* (2006.01)
*H01F 27/28* (2006.01)
*H02J 50/00* (2016.01)
*H02J 50/40* (2016.01)
*H02J 50/70* (2016.01)

(52) U.S. Cl.
CPC .......... *H02J 50/005* (2020.01); *H02J 50/402* (2020.01); *H02J 50/70* (2016.02)

(58) Field of Classification Search
CPC ........ H01F 38/14; B60L 53/122; B60L 5/005; B60L 2200/18; B60L 2200/22; B60L 2200/26; B60L 53/12; H02J 50/005; H02J 50/402; H02J 50/70; H02J 50/10; H02J 50/12; H02J 2310/48; B60Y 2200/11; B60Y 2200/143; B60Y 2200/91; Y02T 90/12; Y02T 10/70; Y02T 10/7072; Y02T 90/14
USPC ............................... 336/5, 173, 65, 200, 206
See application file for complete search history.

| | Voltage(V) | | |
|---|---|---|---|
| | 0mm | 100mm | 200mm |
| Circular coil | 757 | 725 | 619 |
| **Multi-coil** | **816** | **767** | **630** |

PICKUP APPARATUS USING MULTI PICKUP COIL FOR WIRELESS CHARGING OF ELECTRIC VEHICLE AND INDUSTRIAL EQUIPMENT

BACKGROUND OF THE INVENTION

1. Field of the Invention

The present invention relates to a multi pickup coil for wireless charging of an electric vehicle such as an electric bus or an electric passenger car and industrial equipment while stopping or driving, and a pickup apparatus having the same. More specifically, it relates to a multi pickup coil for wireless charging with high capacity and high efficiency per unit area by performing performance enhancement through an optimal design in order to overcome the limitations of the circular pickup coil, and a pickup apparatus having the same.

2. Description of the Related Art

Recently, as an alternative to prevent pollution and reduce dependence on petroleum energy, electric vehicles and industrial equipment driven only by electricity are being actively distributed. However, electric vehicles and hybrid vehicles developed so far have the disadvantage that they must be connected to an external power supply device for a long time using a plug to charge the battery, and the distance that can be driven with single charge is very limited. For this reason, magnetic induction type electric vehicles and industrial equipment are emerging as alternatives to electric vehicles using batteries.

Electric vehicles of the magnetic induction type essentially require a power supply road (or power supply rail) to supply electricity. In order to recharge the electric vehicle required for operation in this way, it is only necessary to drive on the power supply road. That is, when high-frequency power is supplied to the power supply line while the electric vehicle is driving on the power supply road, the power required for driving is supplied by the principle of electromagnetic induction between the power supply line and the power pickup apparatus installed in the electric vehicle. At this time, the pickup apparatus is composed of pickup coil(s). Conventionally, it is composed of a circular coil as shown in FIG. 16, and pickup capacity is determined according to the area and number of turns of the coil. A circular coil is a basic structure of wireless charging, and wireless charging is implemented through a symmetrical circular supply/pickup configuration.

However, considering both stopping and driving wireless charging, there is a problem in that the performance of a circular pickup coil in an online electric vehicle wireless charging system is limited.

SUMMARY OF THE INVENTION

An object of the present invention, which was invented to solve such a problem, is to provide a multi-pickup coil for wireless charging with high capacity and high efficiency per unit area based on performance enhancement through an optimal design in order to overcome the limitations of the circular pickup coil, and a pickup apparatus having the same.

- - - - -

(청구항과 동일한 내용이 들어가는 부분입니다. 리뷰가 완료되면 작성할 예정입니다)

- - - - -

The present invention has an effect of providing a pickup apparatus having multi pickup coil based on optimized and advanced design of a pickup coil in accordance with an online electric vehicle wireless charging system considering both stopping and driving wireless charging.

In addition, the multi pickup coil has an effect of high capacity and high efficiency in a unit area, and has an effect of reducing cost.

BRIEF DESCRIPTION OF THE DRAWINGS

Hereinafter, exemplary embodiments of the present invention for achieving the effects will be described in detail with reference to the accompanying drawings.

DETAILED DESCRIPTION OF THE INVENTION

Figure 1:
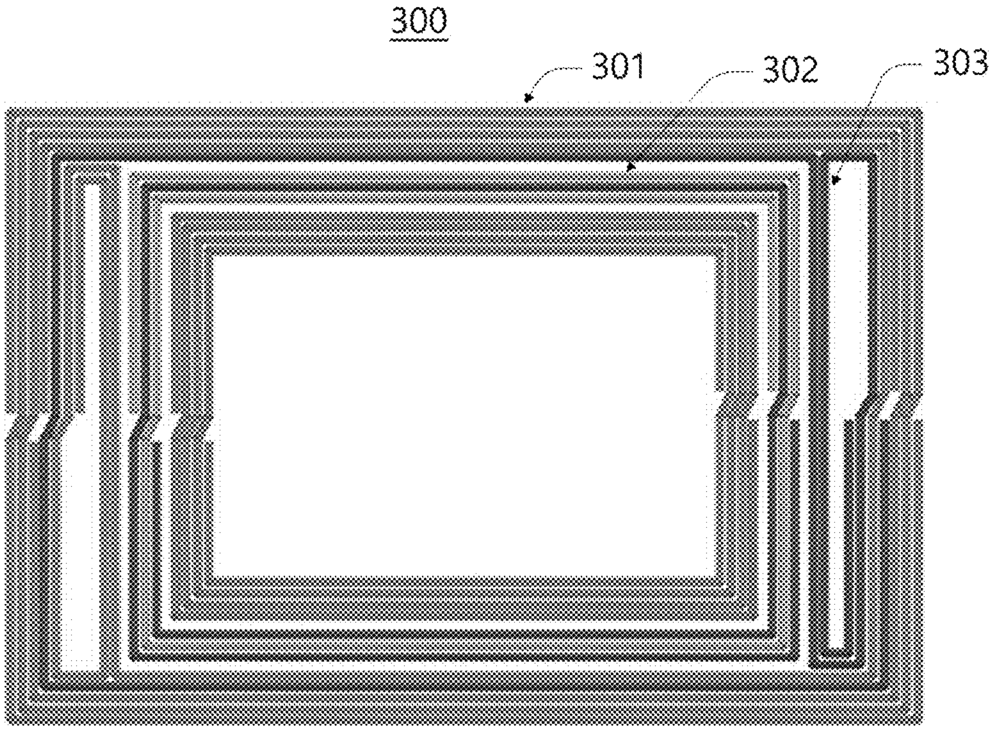
FIG. 1 is an exemplary view showing a multi pickup coil for wireless charging of an electric vehicle and an industrial equipment according to the present invention.

Hereinafter, exemplary embodiments of the present invention will be described in detail with reference to the accompanying drawings. Prior to the description of the present invention, it will be noted that the terms and wordings used in the specification and the claims should not be construed as general and lexical meanings, but should be construed as the meanings and concepts that agree with the technical spirits of the present invention, based on the principle stating that the concepts of the terms may be properly defined by the inventor(s) to describe the invention in the best manner. Therefore, because the examples described in the specification and the configurations illustrated in the drawings are merely for the preferred embodiments of the present invention but cannot represent all the technical sprints of the present invention, it should be understood that various equivalents and modifications that may replace them can be present.

Figure 2:
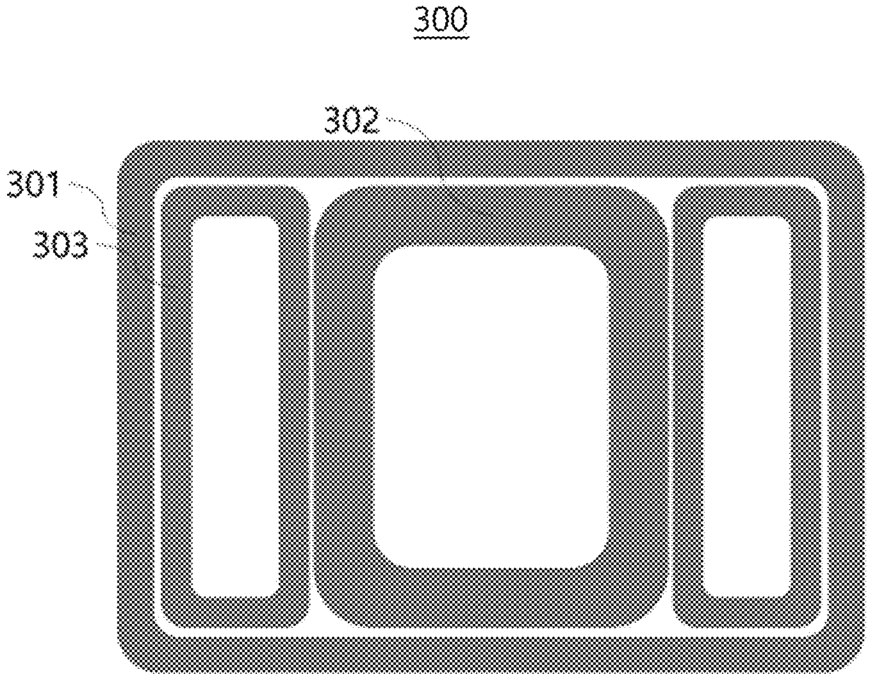
FIG. 2 is a schematic diagram of the multi pickup coil for wireless charging of an electric vehicle and an industrial equipment according to FIG. 1.

FIG. 1 is an exemplary view showing a multi pickup coil for wireless charging of electric vehicles and industrial equipment according to the present invention, and FIG. 2 is a schematic diagram of the multi pickup coil for wireless charging of electric vehicles and industrial equipment according to FIG. 1, being simplified in terms of magnetic induction function.

As shown in FIGS. 1 and 2, the multi pickup coil 300 for wireless charging of electric vehicles and industrial equipment according to the present invention includes a central coil 302, and a pair of wing coil 303 provided on both sides of the central coil 302, and an outer coil 303 arranged at the outside of the central coil 302 and the wing coil 303. The multi pickup coil 300 of the present invention is not limited to the configuration shown in FIG. 2, and the detailed coil structure can be arranged in other forms such as divided or combined.

The central coil 302 of the multi pickup coil 300 according to the present invention is turned so that a through-hole in an air state is formed in the center. The wing coils 303 are disposed on both sides of the central coil 302 at a predetermined interval, and are turned so that an air-state through-hole is formed in the center. That is, the central coil 302 is disposed to be formed in the center, and the wing coils 303 are disposed on both sides of the central coil 302. The outer coil 301 is turned at a predetermined interval on the outer side surrounding the central coil 302 and the wing coils 303. The center coil 302 and the outer coil 301 are turned in the same direction, and the wing coil 303 is turned in the opposite direction to the turn direction of the center coil 302 and the outer coil 301. Therefore, the outer coil 301 is disposed on the outside surrounding the center coil 302 and the wing coil 303, and the current direction of the center coil 302 and the wing coil 303 is the same and the current direction of the wing coil 303 is opposite to those of the central coil 302 and the outer coil 301.

Figure 3:
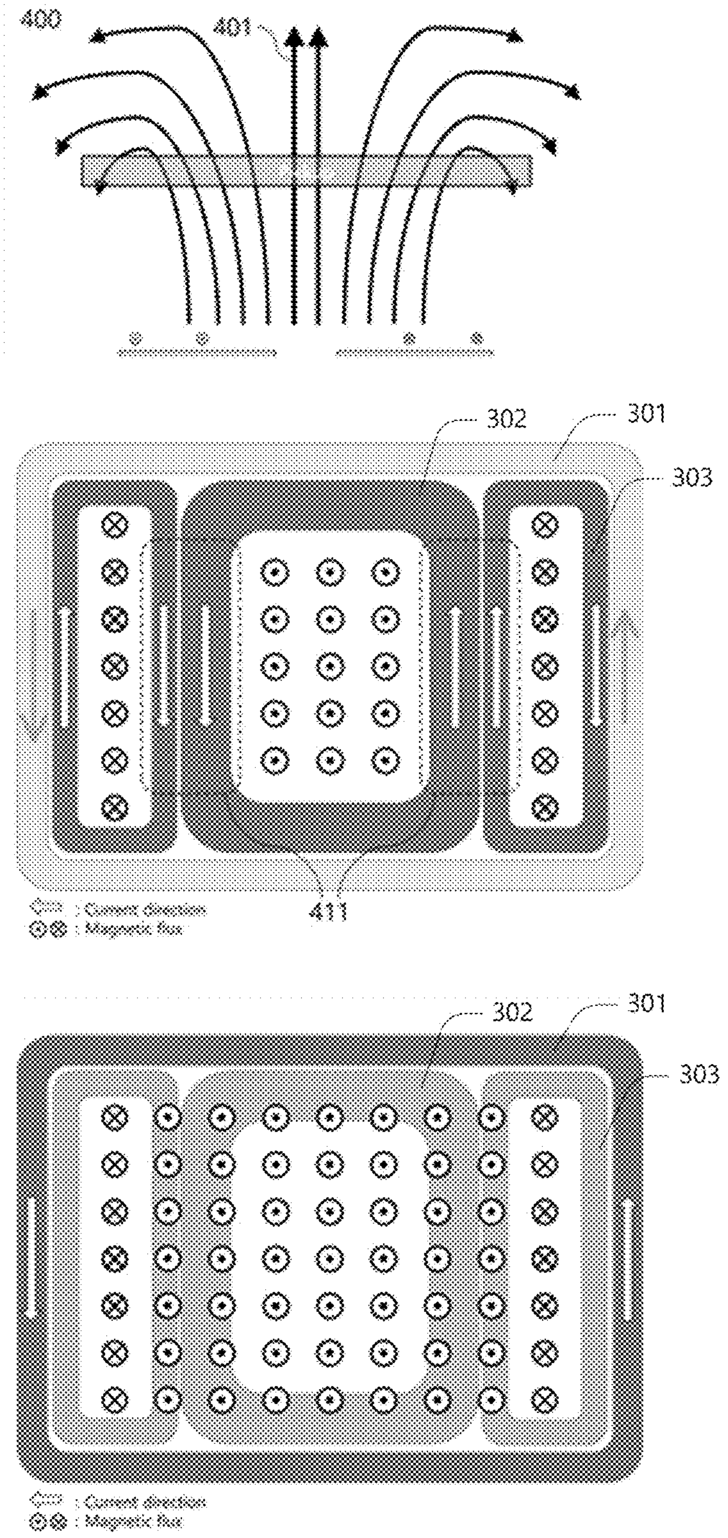
FIG. 3 is an exemplary view showing current directions by lines of magnetic force induced in the multi pickup coil for wireless charging of an electric vehicle and an industrial equipment according to FIG. 2.

FIG. 3 is an exemplary diagram showing a current direction by lines of magnetic force induced in the multi pickup coil for wireless charging of an electric vehicle and industrial equipment according to FIG. 2. In the present invention, multi pickup coils are arranged in consideration of the focusing of the magnetic field and the saturation of the pickup core. Accordingly, the outer coil 301 and the central coil 302 are induced to the magnetic force line in the same direction, and current is generated in the same direction, and the pair of wing coils 303 are induced to the magnetic field line in the opposite direction of those of the outer coil 301 and the central coil 302 and the current is also generated in the opposite direction.

The uppermost view of FIG. 3 shows an example of the pickup apparatus including the multi pickup coil of the present invention and the magnetic force line 401 of the power supply unit, and the middle view of the FIG. 3, the middle view of the FIG. 3 shows that current is formed through magnetic induction by a combination of the central coil 302 and the pair of wing coil 303 of the multi pickup coil of the present invention, and lowermost view of FIG. 3 shows that current is formed by magnetic induction in the outer coil 301. According to the arrangement of the multi pickup coil 300 of the present invention, lines of magnetic force are maximally magnetically induced at the right position to increase the pickup output. Even in a deviation situation, each of the multi pickup coils 300 is magnetically induced to the corresponding magnetic force line according to the change in the magnetic force line to form a current direction and to stably maintain pickup output. At this time, by avoiding addition of a turn of the central coil 302 to form a higher voltage but by adding a turn of the outer coil 301, there is an effect of reducing heat accumulation that is burdened on the portion 411 where the current of the coil overlaps in the same direction. This effect can be explained through FIG. 4.

Figure 4A:
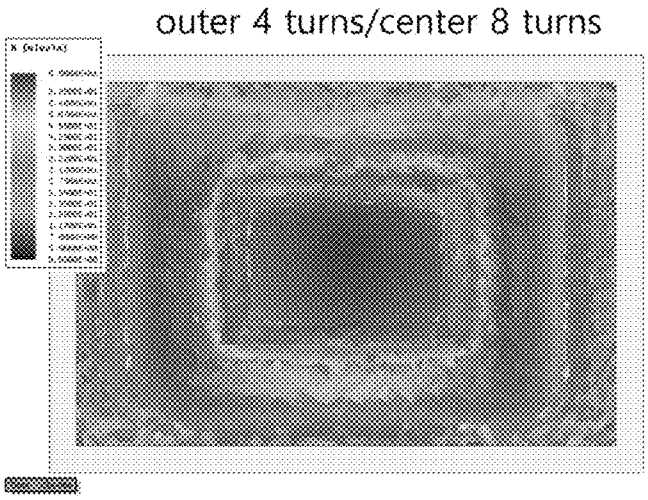
FIGS. 4A and 4B are views showing magnetic field of a pickup core according to a change in turns of an outer coil and a central coil of the multi pickup coil for wireless charging of electric vehicles and industrial equipment according to FIG. 2.
Figure 4B:
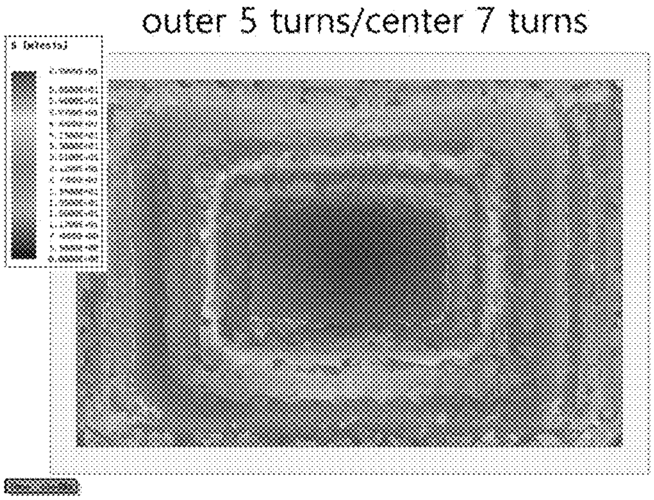

FIGS. 4A and 4B are diagrams showing a magnetic field of a pickup core according to changes in turns of an outer coil and of a central coil in the multi pickup coil for wireless charging of electric vehicles and industrial equipment of FIG. 2. FIG. 4A is a change in the magnetic field corresponding to 4 turns of the outer coil and 8 turns of the central coil in the multi pickup coil 300 of the present invention, and FIG. 4B is a change of the magnetic field corresponding to 5 turns of the outer coil and 7 turns of the central coil. When one turn of the central coil is moved to one turn of the outer coil, the magnetic field decreases.

Figure 5:
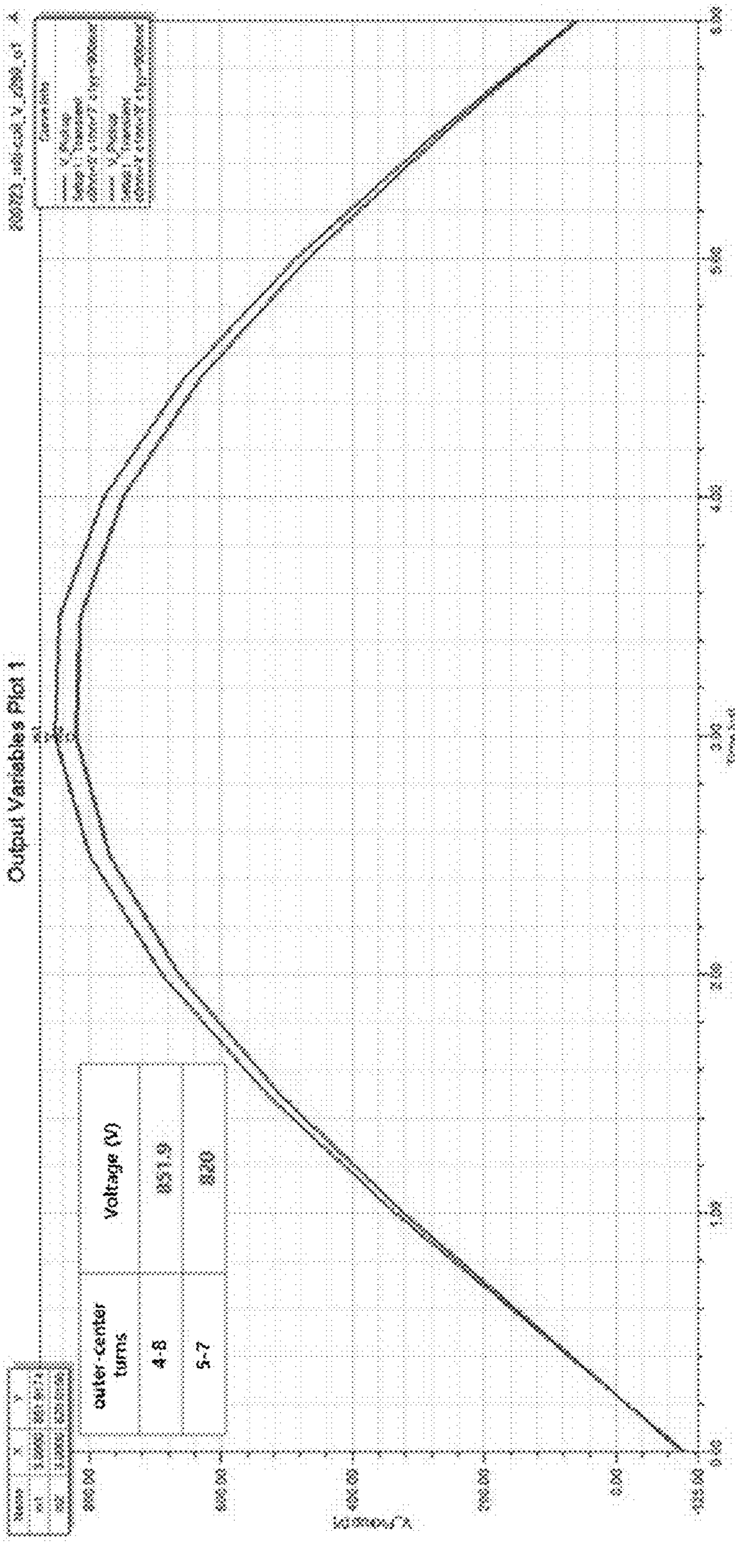
FIG. 5 is a graph showing a difference in voltage and a saturation degree of a pickup core according to a change in turns according to FIG. 4.

FIG. 5 is a graph showing the difference between the saturation degree and voltage of the pickup core according to the change in the turn according to FIGS. 4A and 4B. It is important to control the saturation level of the pickup core low while maintaining the voltage at the system required value and, as shown, it can be confirmed that the multi pickup coil of the present invention conforms to this. That is, the current direction of each pickup coil is set so that the magnetic field can be efficiently received in various situations, and in particular, in case of wireless charging while driving, wireless charging is more advantageous in a deviation situation and heat generation can be effectively managed.

Figure 6:
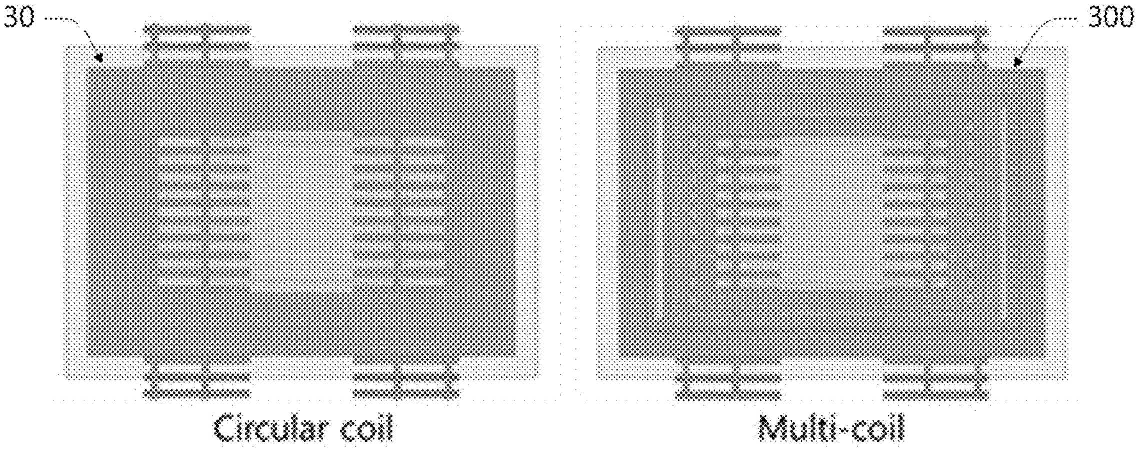
FIG. 6 is a diagram showing a comparison of coil output voltages of a pickup apparatus having a multi pickup coil for wireless charging of electric vehicles and industrial equipment according to the present invention and of a pickup apparatus having circular coils.
Figure 7:
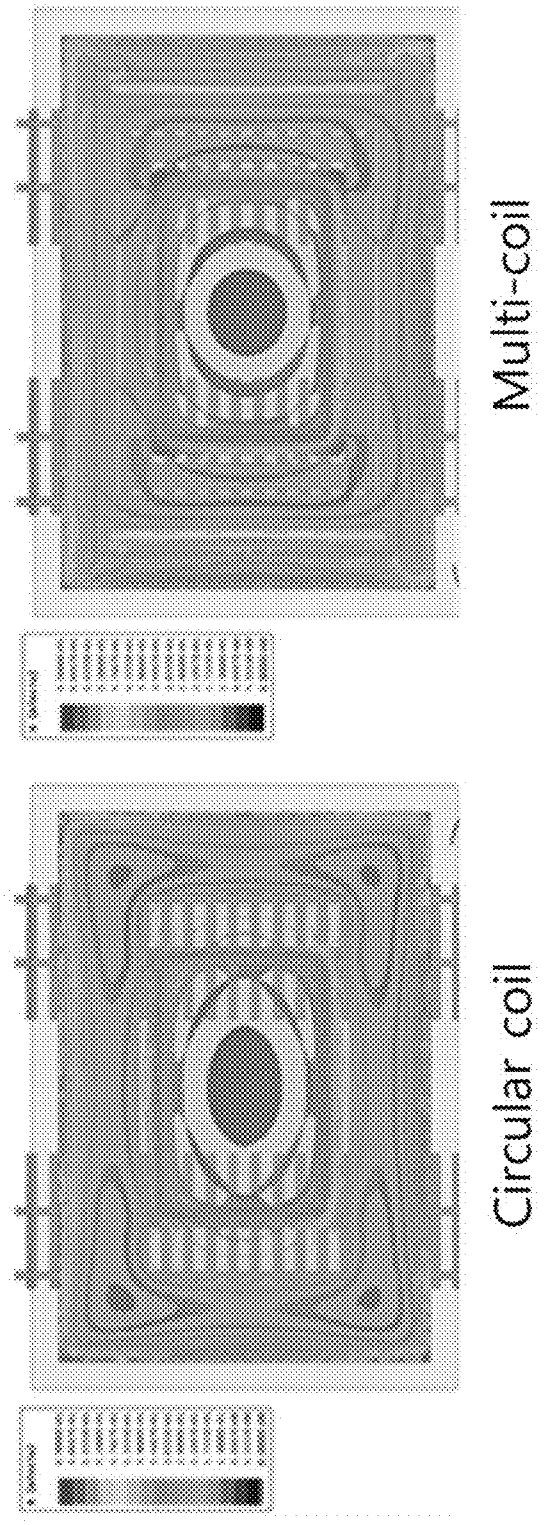
FIG. 7 is a view showing a comparison between magnetic fields of a pickup apparatus with a multi pickup coil for wireless charging of electric vehicles and industrial equipment according to the present invention and a pickup apparatus with circular coils 30.

FIG. 6 compares and shows coil output voltages output from a pickup apparatus equipped with the multi pickup coil 300 for wireless charging of electric vehicles and industrial equipment according to the present invention and a pickup apparatus equipped with a circular coil 30. FIG. 7 compares and shows magnetic fields of a pickup apparatus with the multi pickup coil 300 for wireless charging of electric vehicles and industrial equipment according to the present invention and a pickup apparatus with a circular coil 30.

In FIG. 6, a power supply line and a power supply core of a ladder-shaped power supply apparatus are shown below the multi pickup coil 300 and the circular coil 30, the output voltages of the multi pickup coil 300 of the present invention having the same number of turns and the circular coil 30 are compared in respective deviations. That is, it can be confirmed that the output voltage of the multi pickup coil 300 of the present invention is high at all positions of the normal, 100 mm, and 200 mm.

FIG. 7 shows the effect of the magnetic field to the pickup core in the case of the circular coil the multi pickup coil of the present invention. The pickup apparatus includes a heat dissipation plate made of aluminum, a pickup core, and a pickup coil, and the power supply line and power supply core of the power supply configuration of an online electric vehicle wireless charging system. Here, the heat generating amount of the pickup apparatus is largely influenced by the pickup core. Since the heat generating amount is determined by the degree of saturation of the magnetic field in the pickup core, it is important to control the saturation of the magnetic field while maintaining the output capacity above a certain level. It can be seen that the case of multi pickup coil has less effect on the magnetic field saturation than the case of circular coil.

Figure 8:
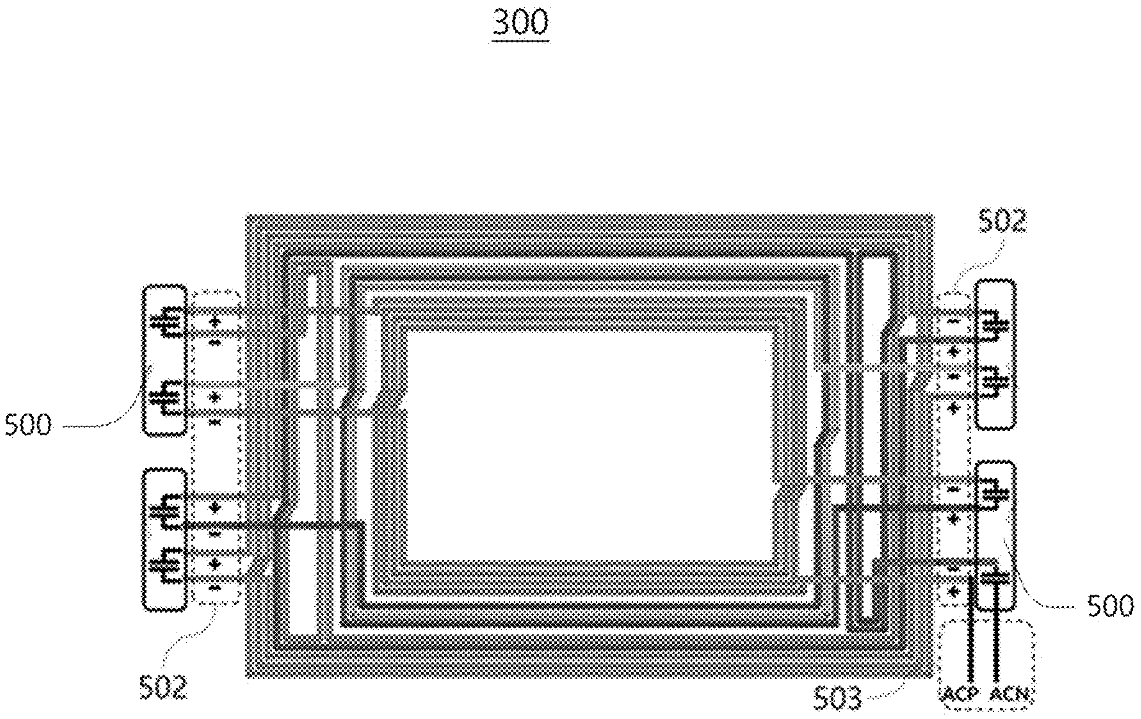
FIG. 8 is a view for explaining the polarity cancellation bundling process of the multi pickup coil according to the present invention.

FIG. 8 is a view for explaining the polarity cancellation bundling process of the multi pickup coil according to the present invention.

As shown in FIG. 8, in order to attenuate the leakage magnetic field of the multi pickup coil branch cable 502 and the input/output cables 503 of the plurality of multi pickup coil sets exposed to the outside, the multi pickup coil 300 of the present invention performs a bundling process that cancels the polarity. At this time, the plurality of branch cables 502 connected to the plurality of capacitor boxes 500 for branching the withstand voltage of the multi pickup coil 300 are arranged so that their polarities cross to offset unwanted magnetic fields.

Figure 9:
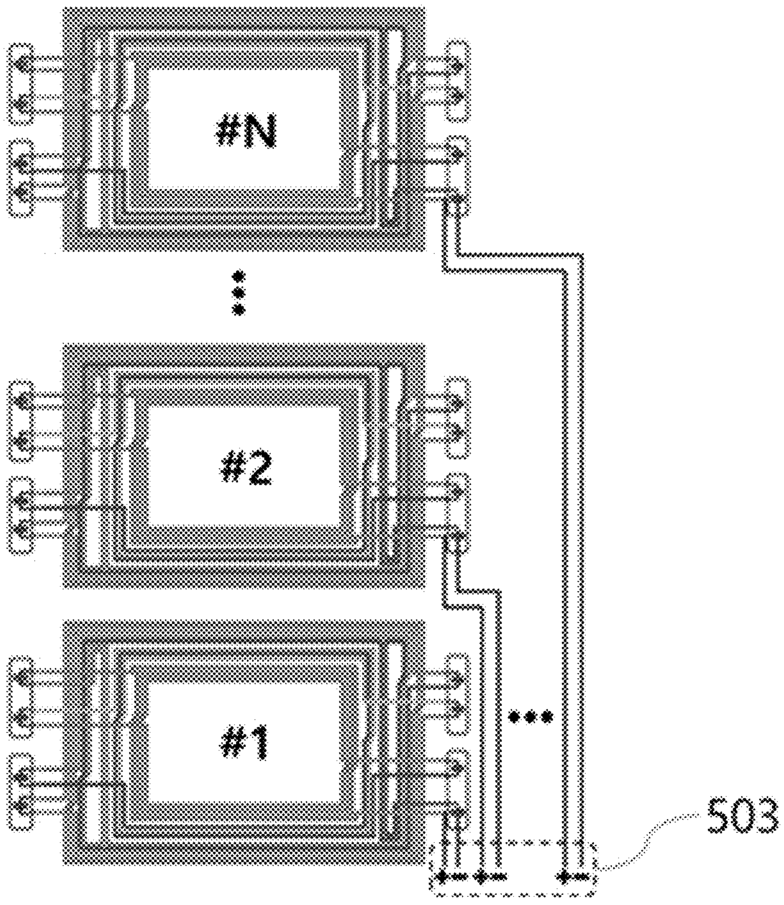
FIG. 9 is a view showing polarity cancellation bundling process when a plurality of multi pickup coils according to FIG. 8 are provided.

FIG. 9 is a view showing the polarity cancellation bundling process when a plurality of multi pickup coils according to FIG. 8 are configured. When configuring a plurality of multi pickup coils, the unnecessary magnetic field is canceled by arranging the polarities of the input/output cables 503 of each multi pickup coil to cross.

Figure 10:
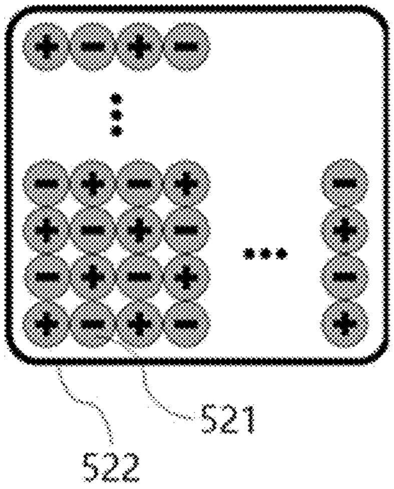
FIG. 10 is a cross-sectional view of a set of input/output cables of a multi pickup coil according to the present invention.

FIG. 10 is a cross-sectional view of an example of a set of input/output cables of a multi pickup coil according to the present invention. The polarity of the input/output cables can be extended while crossing, and the effect is maximized by adding an aluminum shield 522 to the polarity cancellation bundled cable set 521.

Figure 11:
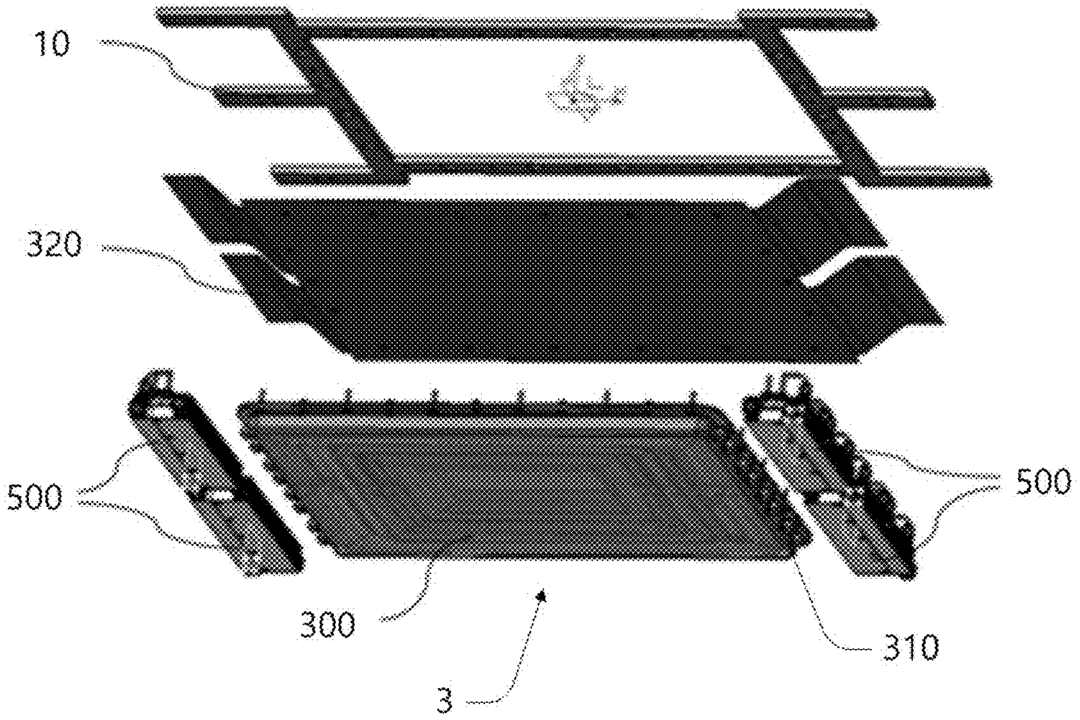
FIG. 11 is a view showing the mounting of a pickup apparatus having multi pickup coils for wireless charging of electric vehicles and industrial equipment according to the present invention.
Figure 12:
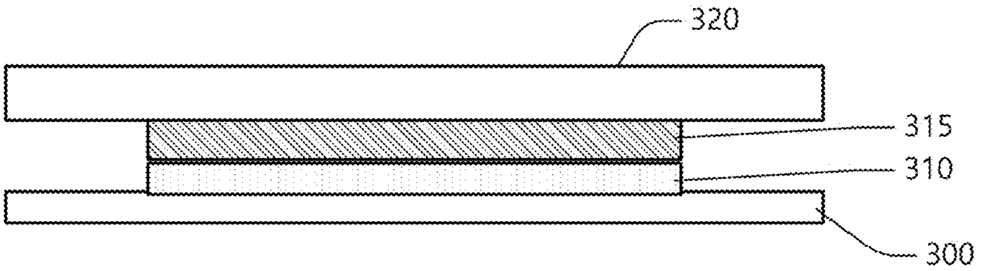
FIG. 12 shows a cross section of the pickup apparatus according to FIG. 11.

FIG. 11 is a view showing a pickup apparatus 3 having multi pickup coil for wireless charging of electric vehicles and industrial equipment according to the present invention, and FIG. 12 is a cross-sectional view of the structure of the pickup apparatus of FIG. 11. In FIG. 11, a support for disposing the pickup apparatus 3 including the pickup coil 300, the pickup core 310, the capacitor box 500, and the heat dissipation plate 320 on the lower part of electric vehicles and industrial equipment, and the pickup apparatus 30 of the present invention is supported using the support 10. The support 10 and the heat dissipation plate 320 can be easily changed according to the situation of the frame structure of the object to be mounted. The capacitor box 500 can be referred to as a power circuit. The heat dissipation plate 320 also serves to reduce the influence of unwanted magnetic fields generated from the capacitor box 500, the pickup coil 300, and the pickup core 310. In addition, in the pickup apparatus 3, as shown in FIG. 12, a multi pickup coil 300 is disposed far from the vehicle (not shown), and a ferrite core 310 is disposed adjacent to the multi pickup coil 300, and a heat dissipation plate 320 for receiving and releasing heat from the ferrite core 310 is disposed on top of the ferrite core 310. A heat dissipation member 315 made of a material electrically insulates the ferrite core 310 and the heat dissipation plate 320 and increases the thermal conductivity of the heat dissipation plate 320 is disposed between the ferrite core 310 and the heat dissipation plate 320. In this case, an aluminum plate may be used as the heat dissipation plate 320, and silicon or ceramic is used as a material of the heat dissipation member 315, but is not limited thereto.

The capacitor box 500 is a box in which a capacitor for branching of the pickup coil 300 is accommodated in order to solve a withstand voltage problem that may occur in the pickup coil 300 and the pickup core 310. The capacitor box 500 is designed to be heat-dissipating, waterproof, and dustproof in order to maintain the function of the capacitor.

Figure 13:
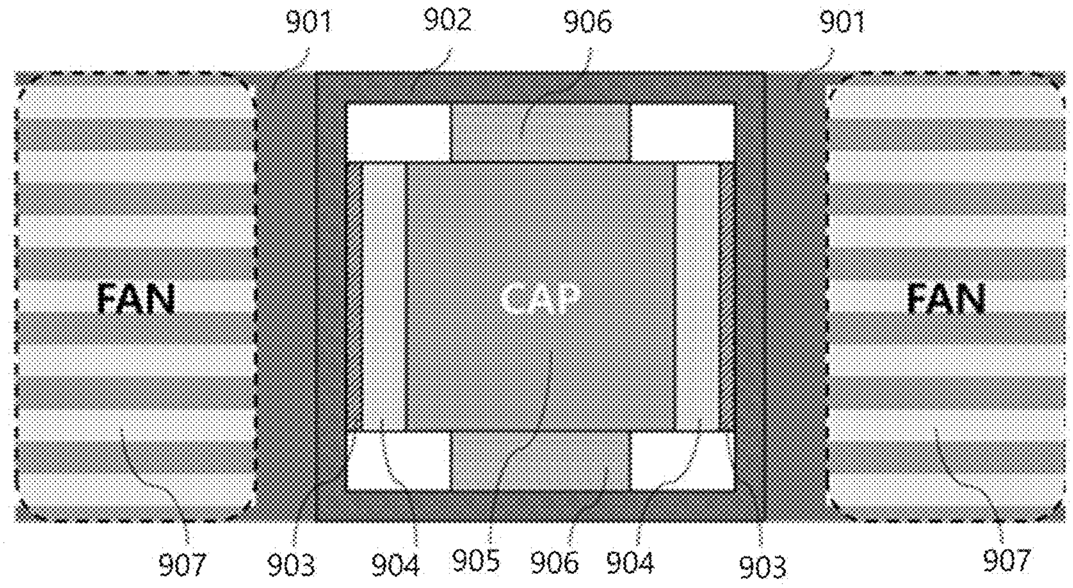
FIGS. 13 and 14 are views showing the inside of the capacitor box according to FIG. 11 in detail.
Figure 14:
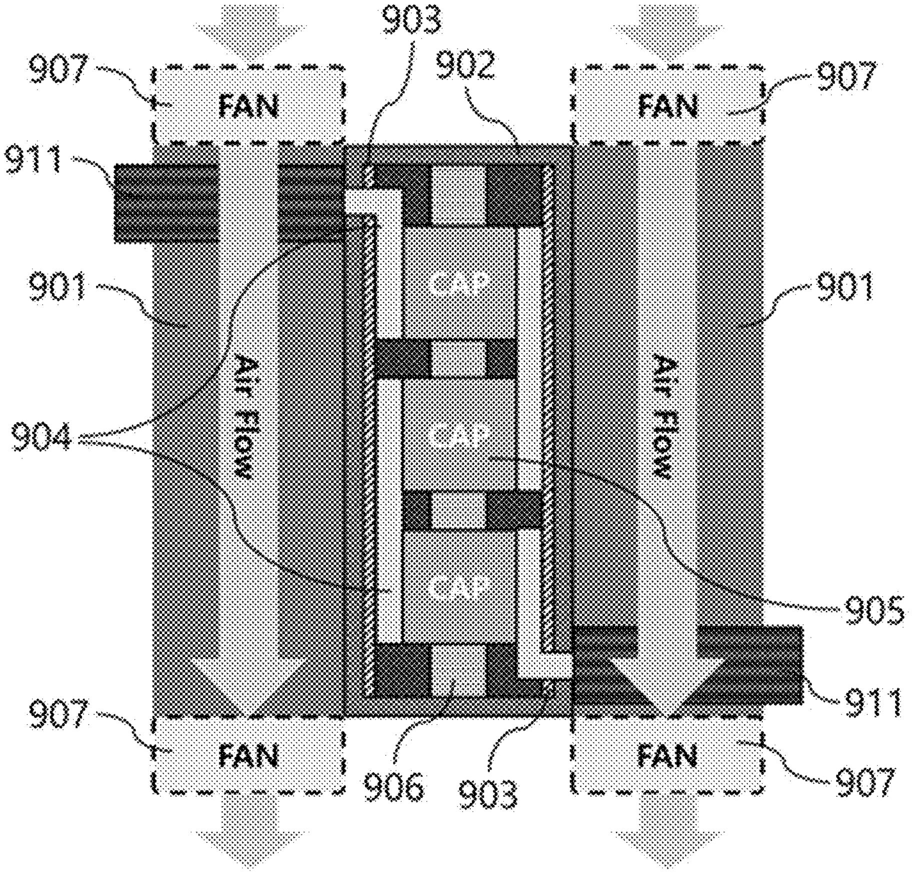

FIG. 13 and FIG. 14 are views showing the inside of the capacitor box according to FIG. 11 in detail. FIG. 13 is a frontal cross-sectional view, and FIG. 14 is a top cross-sectional view. In FIGS. 13 to 14, the series combination of capacitors 905 are shown as an example, but this can be changed to a series/parallel combination using the bus bar 904, and required capacitance can be obtained. The capacitor module is completely insulated from the outer wall 902 by using the insulating spacer 906 so that the enclosure can be waterproof and dustproof. In order to solve the heat accumulation phenomenon caused by the heat of the capacitor 905 that may be caused by such waterproof and dustproof, a heat dissipation member 903 made of a material that electrically insulates the outer wall 902 of the capacitor box and the heat dissipation plate 901 and simultaneously increases thermal conductivity is placed. In addition, by mounting the heat dissipation fan 907 in order to maximize the heat dissipation effect, the heat generation problem of the capacitor box 500 can be effectively addressed. In this case, air-cooling is taken as an example. However, air-cooling, water-cooling, and all heat dissipation means may be applied depending on circumstances.

In addition, wiring connection and maintenance can be easily performed by installing the connector 911 having a waterproof and dustproof function on the outer wall 902.

Figure 15:
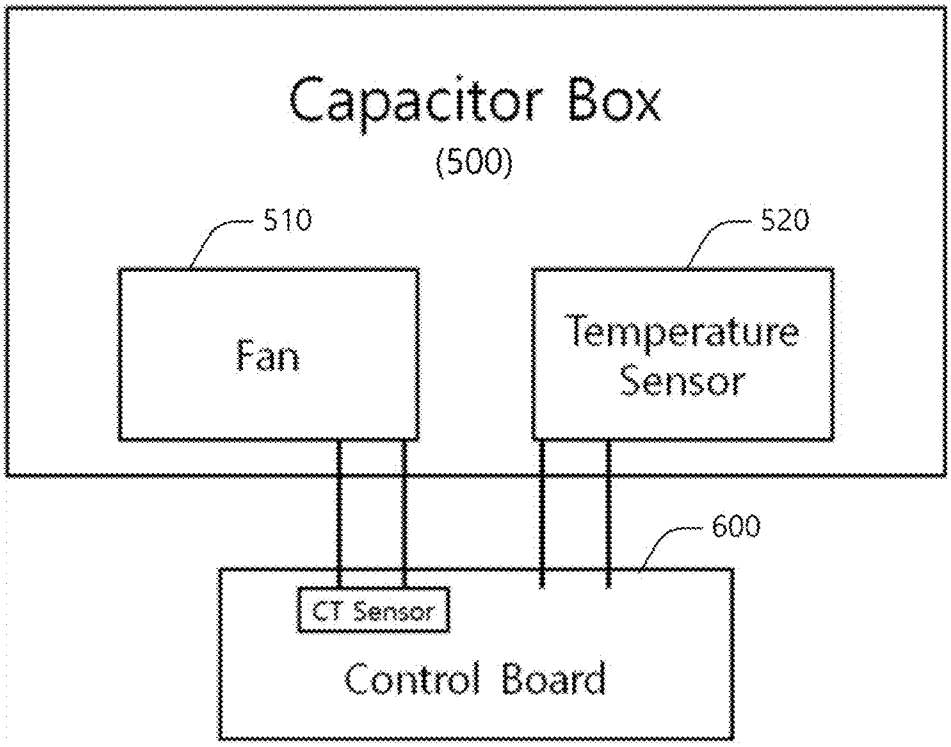
FIG. 15 is a schematic view of a heat dissipation fan and of monitoring a temperature sensor of the capacitor box according to FIG. 11.
Figure 16:
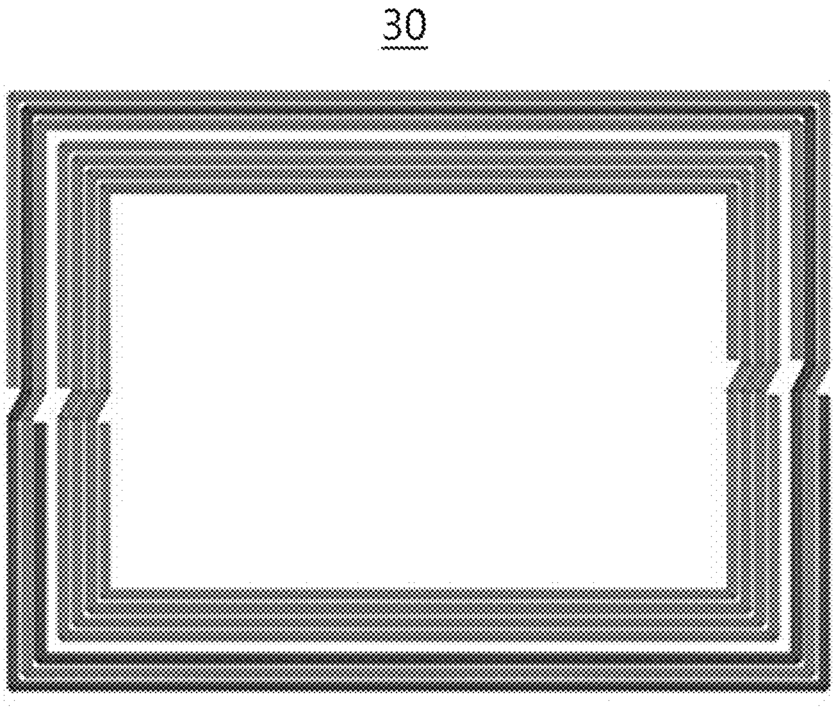
FIG. 16 is a view showing a conventional circular coil.

FIG. 15 is a schematic view of monitoring a heat dissipation fan and a temperature sensor of the capacitor box according to FIG. 11. A plurality of heat dissipation fans 510 attached to the capacitor box 500 are connected in parallel to apply power. At this time, by monitoring the current of the power line with a CT (Current Transformer) sensor, it is possible to determine whether the fan is abnormal. When there is a change compared to the current value during normal operation, it is judged to be abnormal. In the case of the temperature sensor 520, it can be attached to the inside and outside of the capacitor box 500, and when a certain temperature is exceeded, the control board 600 detects it and monitors whether there is an abnormality.

As described above, although the present invention has been described with limited examples and drawings, the present invention is not limited thereto, and the technical spirit of the present invention and the following by those skilled in the art to which the present invention belongs Of course, various modifications and variations are possible within the scope of equivalents of the claims to be described.

What is claimed is:

1. A pickup apparatus for wireless charging of an electric vehicle and an industrial equipment, comprising:

a multi pickup coil disposed distally from the vehicle and including a central coil disposed in the center portion, wing coils disposed on both sides of the central coil, and an outer coil disposed outside of the central coil and the wing coils;

a ferrite core disposed adjacent to the multi pickup coil;

a heat dissipation plate for receiving and discharging heat generated from the ferrite core; and a heat dissipation member disposed between the ferrite core and the heat dissipation plate, electrically insulating the ferrite core and the heat dissipation plate, and made of a material having high thermal conductivity, wherein turn numbers of the central coil and the outer coil of the multi pickup coil are determined to reduce a degree of saturation of the ferrite core while maintaining a required voltage, and leakage magnetic fields of multi pickup coil cables exposed to an outside are attenuated.

2. The pickup apparatus of claim 1, wherein the central coil and the outer coil of the multi pickup coil are turned in a same direction, and the wing coils are turned in a direction opposite to those of the central coil and the outer coil.

3. The pickup apparatus of claim 1, wherein the outer coil disperses the magnetic field of the central coil.

4. The pickup apparatus of claim 1, wherein attenuation of the leakage magnetic fields of the multi pickup coil cables exposed to the outside is achieved by arranging polarities of the cables to cross and bundling the cables such that the polarities cancel each other.

5. The pickup apparatus of claim 1, further comprising a capacitor box for branching withstand voltage of the multi pickup coil, wherein a plurality of branch cables connected to the capacitor box are arranged such that polarities thereof cross to offset unwanted magnetic fields.

6. The pickup apparatus of claim 5, wherein the capacitor box includes at least one function among waterproof, dust-proof, insulation and heat dissipation.

7. The pickup apparatus of claim 5, wherein the capacitor box includes a control board to perform at least one of heat dissipation function management and monitoring and OT sensor management and monitoring.

8. A multi pickup coil for wireless charging of an electric vehicle and an industrial equipment, comprising:

a central coil arranged in a center portion;

wing coils disposed on both sides of the central coil; and an outer coil disposed outside the central coil and the wing coils, wherein turn numbers of the central coil and the outer coil are determined to reduce a degree of saturation of a ferrite core disposed adjacent to at least one of the central coil, the wing coils, and the outer coil while maintaining a required voltage, and leakage magnetic fields of cables exposed to an outside are attenuated.

9. The multi pickup coil of claim 8, wherein current directions of the central coil and the outer coil are the same, and a current direction of the wing coils is opposite to that of the central coil and the outer coil.

10. The multi pickup coil of claim 8, wherein the outer coil disperses the magnetic field of the central coil.

11. The multi pickup coil of claim 8, wherein attenuation of the leakage magnetic fields of the cables exposed to the outside is achieved by arranging polarities of the cables to cross and bundling the cables such that the polarities cancel each other.

* * * * *